United States Patent
Sallas et al.

(10) Patent No.: US 9,891,329 B2
(45) Date of Patent: Feb. 13, 2018

(54) METHOD AND SYSTEM FOR PNEUMATIC CONTROL FOR VIBRATOR SOURCE ELEMENT

(71) Applicant: CGG SERVICES SAS, Massy (FR)

(72) Inventors: John Sallas, Plano, TX (US); Thierry Ameil, Paris (FR); Robert Dowle, Massy (FR); Dominique Thomas, Gif-sur-Yvette (FR)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 15/356,844

(22) Filed: Nov. 21, 2016

(65) Prior Publication Data

US 2017/0068005 A1     Mar. 9, 2017

Related U.S. Application Data

(62) Division of application No. 14/172,004, filed on Feb. 4, 2014, now Pat. No. 9,535,180.

(Continued)

(51) Int. Cl.
*G01V 1/00* (2006.01)
*G01V 1/04* (2006.01)
(Continued)

(52) U.S. Cl.
CPC ............... *G01V 1/04* (2013.01); *G01V 1/135* (2013.01); *G01V 1/143* (2013.01); *G01V 1/145* (2013.01);
(Continued)

(58) Field of Classification Search
CPC ........ G01V 1/135; G01V 1/145; G01V 1/133; G01V 1/04; G01V 1/155
(Continued)

(56) References Cited

U.S. PATENT DOCUMENTS 3,212,473 A * 10/1965 Bouyoucos ............ G01V 1/135
116/137 A
3,676,840 A     7/1972 Bays
(Continued)

FOREIGN PATENT DOCUMENTS

GB         1183791 A     3/1970

OTHER PUBLICATIONS

Australian Office Action received in corresponding AU Application No. 2014220666, dated Jun. 2, 2017.

*Primary Examiner* — Hovhannes Baghdasaryan
(74) *Attorney, Agent, or Firm* — Patent Portfolio Builders PLLC

(57) ABSTRACT

Method, source array and source element that generate seismic waves. The source element includes an enclosure having an opening covered by a piston; a local supply accumulator fluidly communicating with an interior of the enclosure, a pressure of the fluid inside the local supply accumulator being larger than a pressure of the fluid inside the enclosure; a local supply valve located between the local supply accumulator and the enclosure and configured to control a flow of the fluid from the local supply accumulator to the interior of the enclosure; and a controller configured to control the local supply valve such that the pressure inside the enclosure does not fall below a first preset value based upon an ambient pressure of the enclosure while seismic waves are generated.

6 Claims, 18 Drawing Sheets

Related U.S. Application Data

(60) Provisional application No. 61/767,851, filed on Feb. 22, 2013, provisional application No. 61/767,850, filed on Feb. 22, 2013.

(51) Int. Cl.
  *G01V 1/155* (2006.01)
  *G01V 1/145* (2006.01)
  *G01V 1/18* (2006.01)
  *G01V 1/135* (2006.01)
  *G01V 1/143* (2006.01)
  *G01V 1/38* (2006.01)

(52) U.S. Cl.
  CPC .............. *G01V 1/155* (2013.01); *G01V 1/188* (2013.01); *G01V 1/38* (2013.01); *G01V 2210/1293* (2013.01)

(58) Field of Classification Search
  USPC .......................................................... 367/143
  See application file for complete search history.

(56) References Cited

U.S. PATENT DOCUMENTS

| | | | |
|---|---|---|---|
| 4,030,063 | A * | 6/1977 | Wallen ................. G10K 9/10 116/137 A |
| 4,185,714 | A | 1/1980 | Pascouet et al. |
| 4,514,834 | A | 4/1985 | Hanson et al. |
| 4,556,963 | A | 12/1985 | Hugus et al. |
| 4,557,348 | A | 12/1985 | Mifsud |
| 4,578,784 | A | 3/1986 | Mifsud |
| 4,667,766 | A | 5/1987 | Melvin |
| 4,885,727 | A | 12/1989 | Auger et al. |
| 5,140,560 | A | 8/1992 | Percy |
| 5,144,588 | A | 9/1992 | Johnston et al. |
| 5,199,005 | A | 3/1993 | Forsberg |
| 2001/0004084 | A1 | 6/2001 | Hiral et al. |
| 2003/0151974 | A1 | 8/2003 | Kutty et al. |
| 2010/0302902 | A1 | 12/2010 | Nance et al. |
| 2011/0123277 | A1 | 5/2011 | Westerbeek et al. |
| 2011/0170375 | A1 | 7/2011 | Thompson et al. |
| 2012/0113756 | A1 | 5/2012 | Carcaterra et al. |
| 2013/0100778 | A1 | 4/2013 | Ruet et al. |

\* cited by examiner

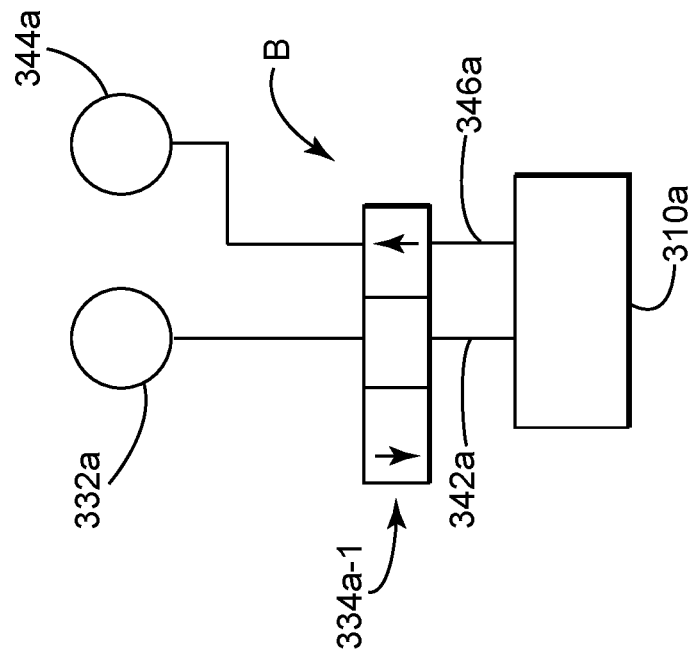
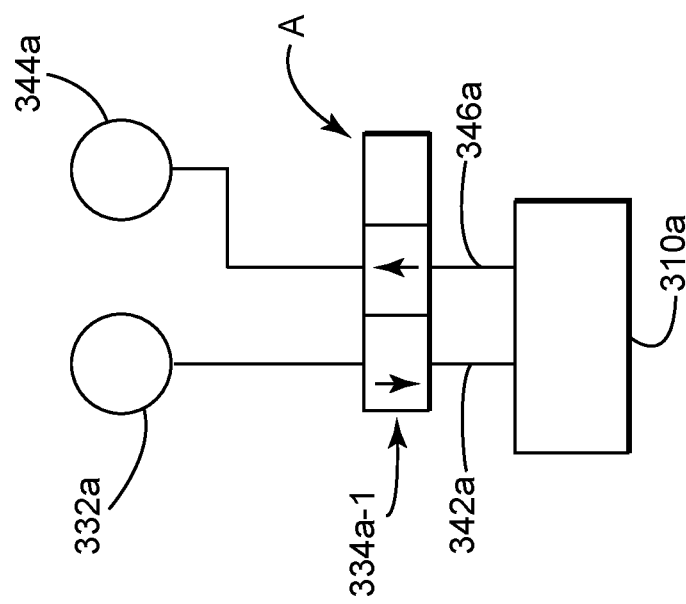

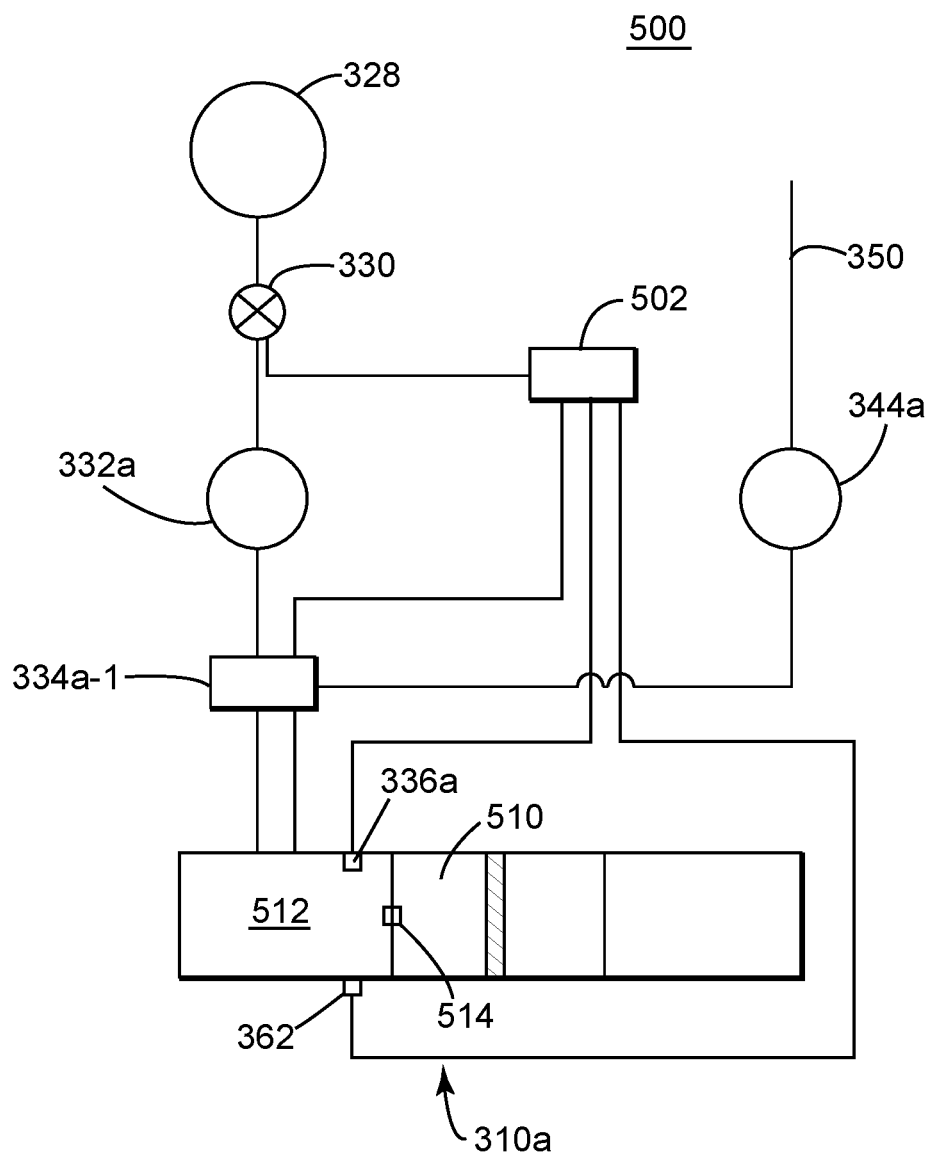

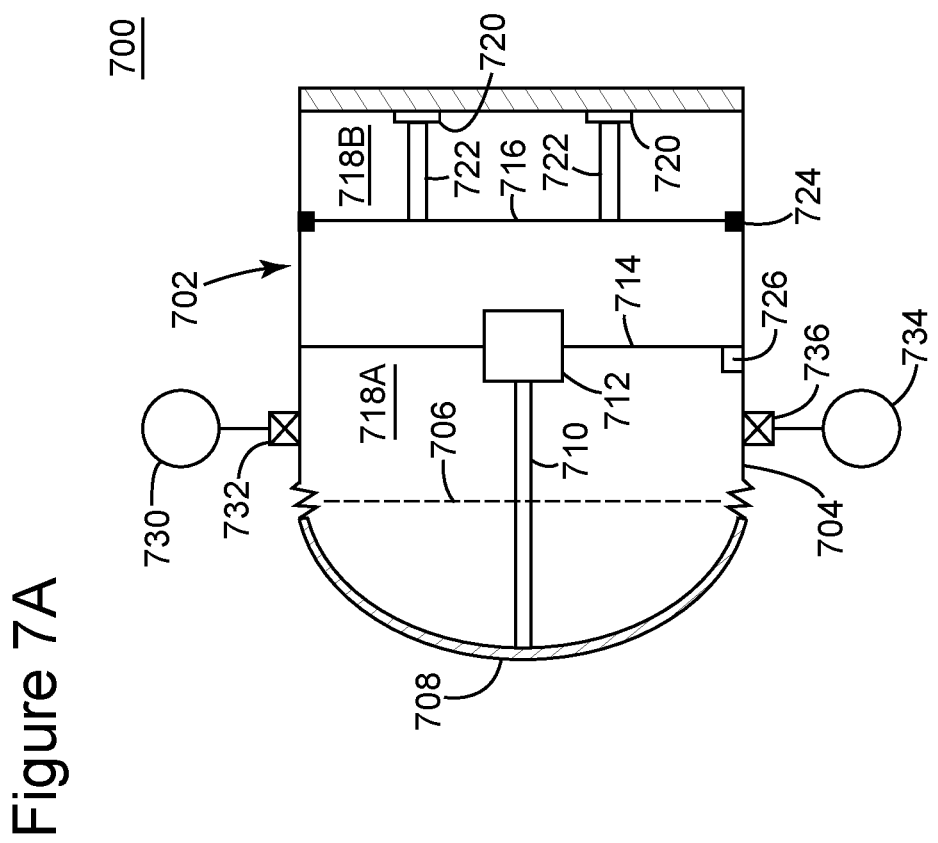

METHOD AND SYSTEM FOR PNEUMATIC CONTROL FOR VIBRATOR SOURCE ELEMENT

RELATED APPLICATIONS

The present application is a divisional of, and claims priority from U.S. patent application Ser. No. 14/172,004, filed Feb. 4, 2014, entitled "Method and System for Pneumatic Control for Vibrator Source Element", to John Sallas, Thierry Ameil, Robert Dowle and Dominique Thomas, which is related to, and claims priority from U.S. Provisional Application No. 61/767,851, filed Feb. 22, 2013, entitled "Pneumatic Control System for Maintaining a Hydrostatic Balance in a Marine Seismic Vibrator Array" which is related to, and claims priority from U.S. Provisional Application No. 61/767,850, filed Feb. 22, 2013, entitled "Pneumatic Control System for Maintaining a Hydrostatic Balance in a Marine Seismic Vibrator Array", the disclosures of which are incorporated here by reference.

BACKGROUND

Technical Field

Embodiments of the subject matter disclosed herein generally relate to methods and systems and, more particularly, to mechanisms and techniques for controlling internal pressure of a marine vibratory source element for maintaining hydrostatic balance with the ambient pressure.

Discussion of the Background

Reflection seismology is a method of geophysical exploration to determine the properties of a portion of a subsurface layer in the earth, information that is especially helpful in the oil and gas industry. Marine reflection seismology is based on the use of a controlled source that sends energy waves into the earth. By measuring the time it takes for the reflections to come back to plural receivers, it is possible to estimate the depth and/or composition of the features causing such reflections. These features may be associated with subterranean hydrocarbon deposits.

For marine applications, a seismic survey system 100, as illustrated in FIG. 1, includes a vessel 102 that tows plural streamers 110 (only one is visible in the figure) and a seismic source 130. Streamer 110 is attached through a lead-in cable (or other cables) 112 to vessel 102, while source 130 is attached through an umbilical 132 to the vessel. A head float 114, which floats at the water surface 104, is connected through a cable 116 to a head end 110A of streamer 110, while a tail buoy 118 is connected, through a similar cable 116, to a tail end 110B of streamer 110. Head float 114 and tail buoy 118 maintain the streamer's depth and are also provided with GPS (Global Positioning System) or other communication equipment 120 for determining the streamer's position.

In this regard, knowing the exact position of each sensor 122 (only a few are illustrated in FIG. 1 for simplicity) is important when processing the seismic data these sensors record. Thus, vessel 102 is also provided with GPS 124 and a controller 126 that collects the position data associated with streamer head and tail ends and also the position of the vessel and calculates, based on the streamer's known geometry, the absolute position of each sensor.

The same happens for source 130. A GPS system 134 is located on float 137 for determining the position of the source elements 136. Source elements 136 are connected to float 137 to travel at desired depths below the water surface 104. During operation, vessel 102 follows a predetermined path T while source elements (usually air guns) 136 emit seismic waves 140. These waves bounce off the ocean bottom 142 and other layer interfaces below the ocean bottom 142 and propagate as reflected/refracted waves 144 that are recorded by sensors 122. The positions of both the source element 136 and recording sensor 122 are estimated based on GPS systems 120 and 134 and recorded together with the seismic data in a storage device 127 onboard the vessel.

A source element may be impulsive (e.g., an air gun) or vibratory. A vibratory source element is described in U.S. patent application Ser. No. 13/415,216 (herein the '216 application), filed on Mar. 8, 2012, and entitled, "Source for Marine Seismic Acquisition and Method," assigned to the same assignee as the present application, the entire content of which is incorporated herein by reference.

A vibratory source element experiences increased ambient pressure as its depth increases. The increase in ambient pressure is approximately 1 bar for every 10 m of added depth. For vibratory source elements with a large radiating surface (pistons), the resultant force acting on this surface due to the hydrostatic force can become so great that, in fact, the resultant force exceeds the force capability of the actuator used to drive the piston. If this happens, the seismic source element becomes unable to generate seismic waves. Transient effects, for example sea swells, can also produce localized fluctuations in ambient pressure near the source that can also result in significant forces that act on the piston face. FIG. 6 illustrates an estimate of the variation in ambient pressure for a source located at 25 m depth that might be experienced during a seismic survey.

To make best use of the force that can be developed by the source element's actuator, one approach is to counteract (i.e., balance) the static forces acting on the pistons so the actuator only provides a dynamic force for generating the seismic waves.

Thus, it is desirable to provide systems and methods that balance the hydrostatic force/pressure acting on the source element while being towed underwater.

SUMMARY

According to one exemplary embodiment, there is a source element for generating seismic waves in water. The source element includes an enclosure having an opening covered by a piston, wherein the piston is configured to move relative to the enclosure to generate the seismic waves; a local supply accumulator fluidly communicating with an interior of the enclosure, wherein the local supply accumulator stores a fluid that is also present inside the enclosure, a pressure of the fluid inside the local supply accumulator being larger than a pressure of the fluid inside the enclosure; a local supply valve located between the local supply accumulator and the enclosure and configured to control a flow of the fluid from the local supply accumulator to the interior of the enclosure; and a controller configured to control the local supply valve such that the pressure inside the enclosure does not fall below a first preset value based upon an ambient pressure of the enclosure while seismic waves are generated.

According to another embodiment, there is a source sub-array for generating seismic waves in water. The source sub-array includes a float configured to float in water and plural source elements suspended from the float. A source element includes an enclosure having an opening covered by a piston, wherein the piston is configured to move relative to the enclosure to generate the seismic waves, a local supply accumulator fluidly communicating with an interior of the enclosure, wherein the local supply accumulator stores a fluid that is also present inside the enclosure, a pressure of the fluid inside the local supply accumulator being larger than a pressure of the fluid inside the enclosure, a local supply valve located between the local supply accumulator and the enclosure and configured to control a flow of the fluid from the local supply accumulator to the interior of the enclosure, and a controller configured to control the local supply valve such that the pressure inside the enclosure does not fall below an ambient pressure of the enclosure while seismic waves are generated.

According to yet another embodiment, there is a source element for generating seismic waves in water. The source element includes an enclosure having an opening; a main piston connected to the enclosure to prevent ambient water entering the opening, a movement of the main piston generating the seismic waves; a secondary piston located inside the enclosure and dividing the enclosure into first chamber and second chamber, wherein the first chamber is fluidly isolated from the second chamber; an actuation system for actuating the secondary piston inside the enclosure; and a controller connected to the actuation system and configured to increase or decrease a volume of the first chamber by moving the secondary piston for maintaining a pressure inside the first chamber balanced with an outside pressure of the enclosure.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 4A-C illustrate pneumatic valve states while controlling a source element;

FIG. 5 is a schematic diagram illustrating fluid flows while controlling a source element;

FIG. 7A is a schematic diagram of a pneumatic control system according to another embodiment;

DETAILED DESCRIPTION

Figure 1:
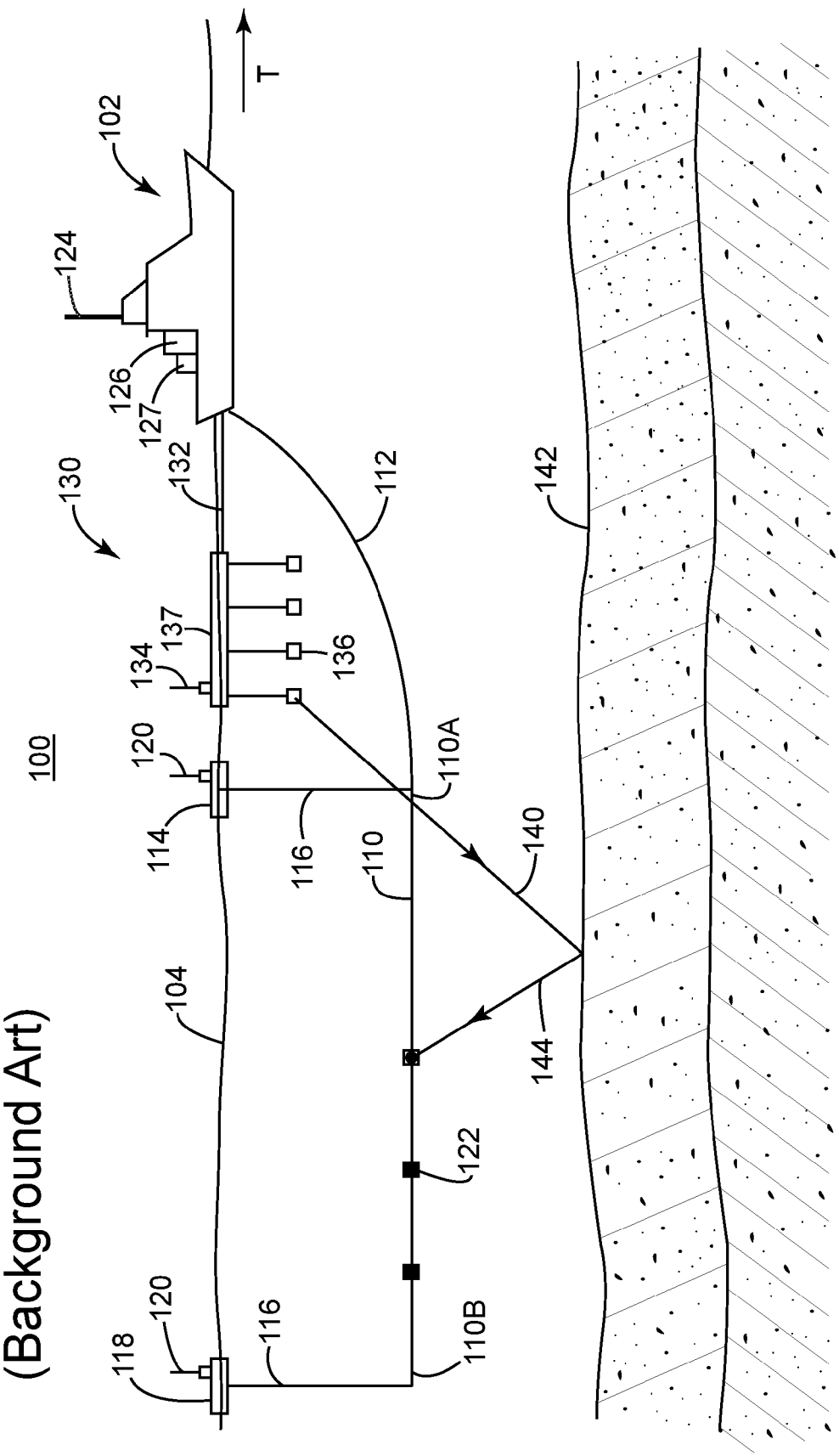
FIG. 1 is a schematic diagram of a seismic acquisition system.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a vibratory source element configured to generate acoustic energy in a marine environment. However, the embodiments to be discussed next are not limited to a marine environment; they may be applied to any type of source of seismic waves that uses moving pistons, for example, in sources that are raised and lowered and used in fluid filled boreholes for RVSP (reverse vertical seismic profiling) surveys or cross-hole tomography work.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a pneumatic control system for maintaining a balance between a source element's interior pressure and the ambient pressure is configured to have a control loop that adjusts the interior pressure as the source element's piston moves back and forth. Thus, for some of the time the pressure inside the source element needs to be increased, while for other times it has to be decreased. An advantage of maintaining hydrostatic balance around the source element pistons is that this helps to maintain the actuator's position near the center of its stroke limits. Particularly for source elements' operation that generates low frequencies, where large piston displacements are required to radiate useful far-field acoustic signal levels, it is desirable to achieve correct centering of the actuator. Improper actuator centering may generate great forces inside the source element's structure, which in time may result in mechanical failure.

Prior to discussing various pneumatic control systems, a vibratory source element is introduced, which, for simplicity, is referred to herein as a source element. A source element may have an electro-magnetic linear actuator system configured to drive a piston (or a pair of pistons). Note that a piston defines not only a rigid material but may include a soft material, for example, a diagram. Thus, a piston is a material that separates an inside of the source element from the ambient. However, it is possible to have a hydraulic, pneumatic, magnetostrictive or piezoelectric actuator or other appropriate mechanisms instead of the electro-magnetic actuator. A source element may be driven by an appropriate pilot signal. Plural source elements may be located together to form a source sub-array. One or more source sub-arrays form a source array. A vessel is configured to tow a source array. A pilot signal is designed as a source array target signal such that the total array far-field output follows a desired target power spectrum. A drive signal derived from the pilot signal is applied to each source element. A pilot signal may have any shape, e.g., pseudorandom, cosine or sine, increasing or decreasing frequency, etc.

Figure 2A:
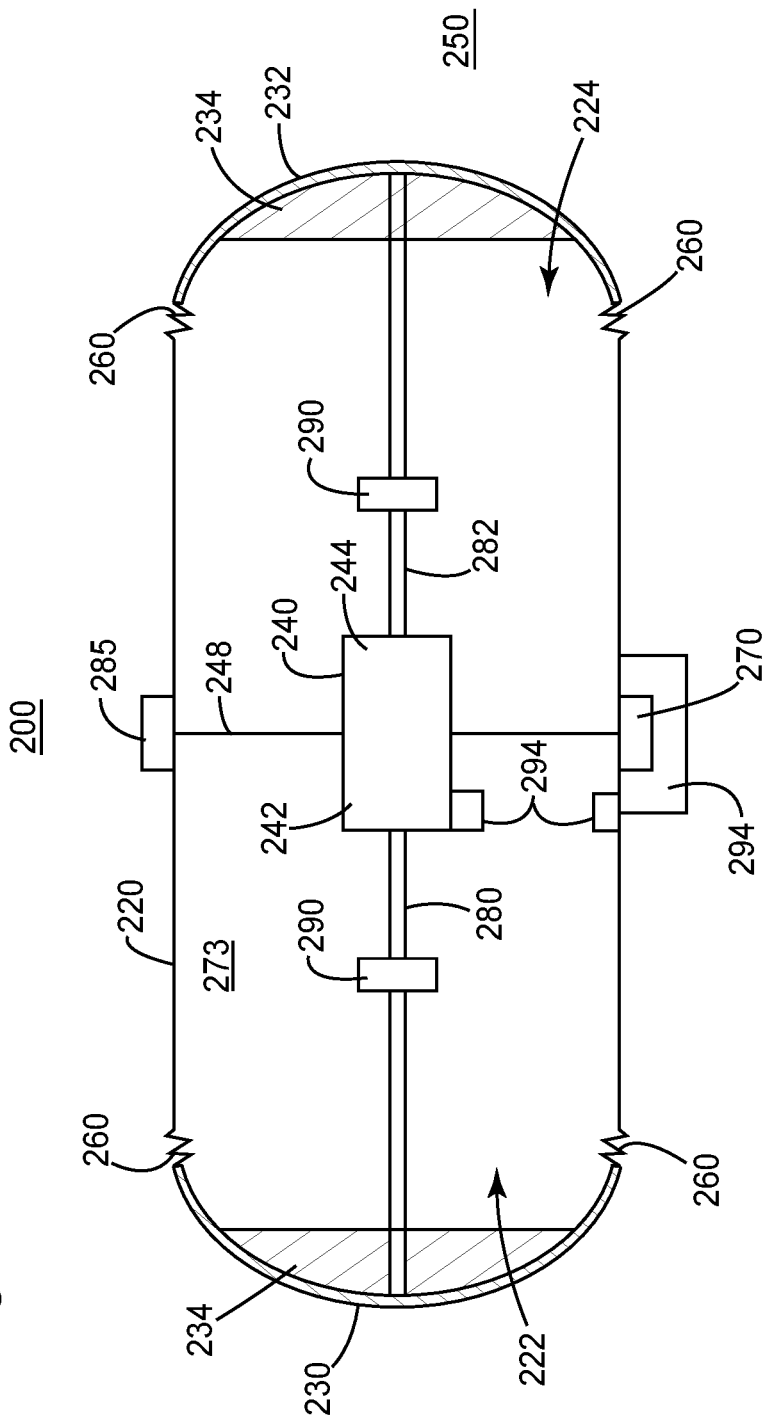
FIGS. 2A-B are schematic diagrams of high- and low-frequency source elements.

According to the embodiment illustrated in FIG. 2A, a source element 200 has a housing 220 that, together with pistons 230 and 232, enclose an actuator system 240 and separate it from the ambient 250, which might be water. Although FIG. 2A shows two movable pistons 230 and 232, note that a source element may have any number of pistons, e.g., one piston or more than two.

Housing 220 may be configured as a single enclosure as illustrated in FIG. 2A and have first and second openings 222 and 224 configured to be closed by pistons 230 and 232. However, in another embodiment 201 illustrated in FIG. 2B, housing 220 may include two enclosures 220A and 220B rigidly connected to each other by a member 202. A single actuator system 240 may be configured to simultaneously drive pistons 230 and 232 in opposite directions to generate seismic waves, as illustrated in FIG. 2A. Two actuator systems 240A and 240B may be used in the embodiment of FIG. 2B. In one application, pistons 230 and 232 are rigid, i.e., made of a rigid material, and reinforced, as will be discussed later, with rigid ribs 234. Actuator system 240 may include one or more individual electro-magnetic actuators 242 and 244. Other types of actuators may be used. Irrespective of how many individual actuators are used in source element 200 or 201, the actuators are provided in pairs configured to act simultaneously in opposite directions on corresponding pistons in order to prevent source element "rocking" motion. Note that it is undesirable to "rock" the source element when generating waves because the source element's position should follow a predetermined path when towed in water.

Figure 2B:
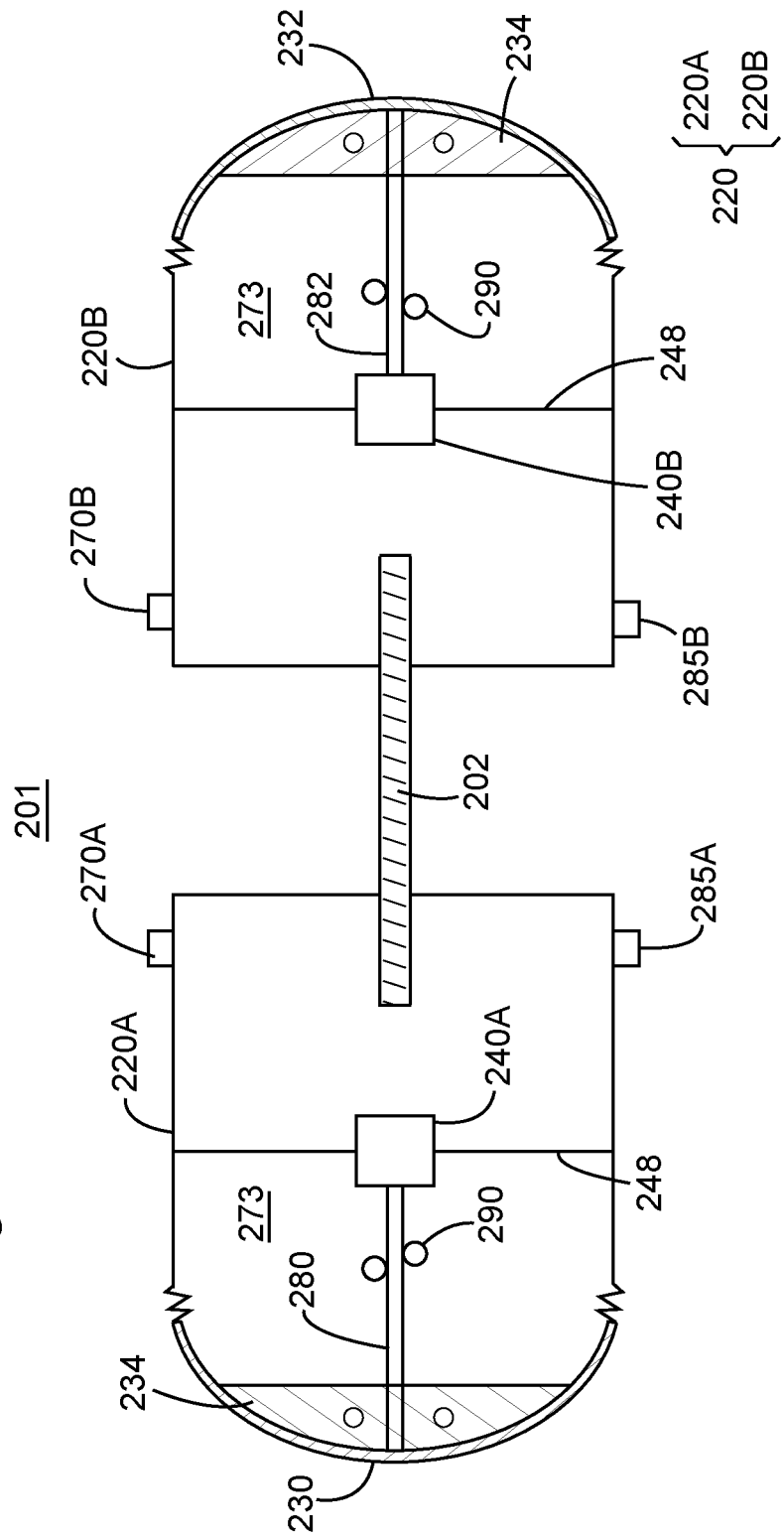

The size and configuration of the housing, pistons and actuator system depend on the source element's acoustic output. For example, a high-frequency source element (as illustrated in FIG. 2A) has smaller sizes than a low-frequency source element (as illustrated in FIG. 2B). In one embodiment, the high-frequency source element's housing length is about 1.5 m and its diameter is about 450 mm. Total housing length of the low-frequency source element is about 3 m and its diameter is about 900 mm. Thus, in one application, the low-frequency source element is substantially double the size of the high-frequency source element.

Actuator system 240 may be attached to housing 220 by an attachment 248 (e.g., a wall or a bracket). Various other components described elsewhere are illustrated in FIGS. 2A and 2B. Such components may include a sealing mechanism 260 provided between the pistons and the housing, a pressure regulation mechanism 285 or 285A and 285B configured to balance the external pressure of the ambient 250 with a pressure of a fluid 273 enclosed by housing 220 (enclosed fluid 273 may be air or other gases or mixtures of gases), one or more shafts (280 and 282) per piston to transmit the actuation motion from the actuation system 240 to pistons 230 and 232, a guiding system 290 for the shafts, a cooling system 294 to transfer heat from the actuator system 270 to ambient 250, one or more local control devices 270, 270A, 270B to coordinate the movement of these elements, etc.

Figure 3A:
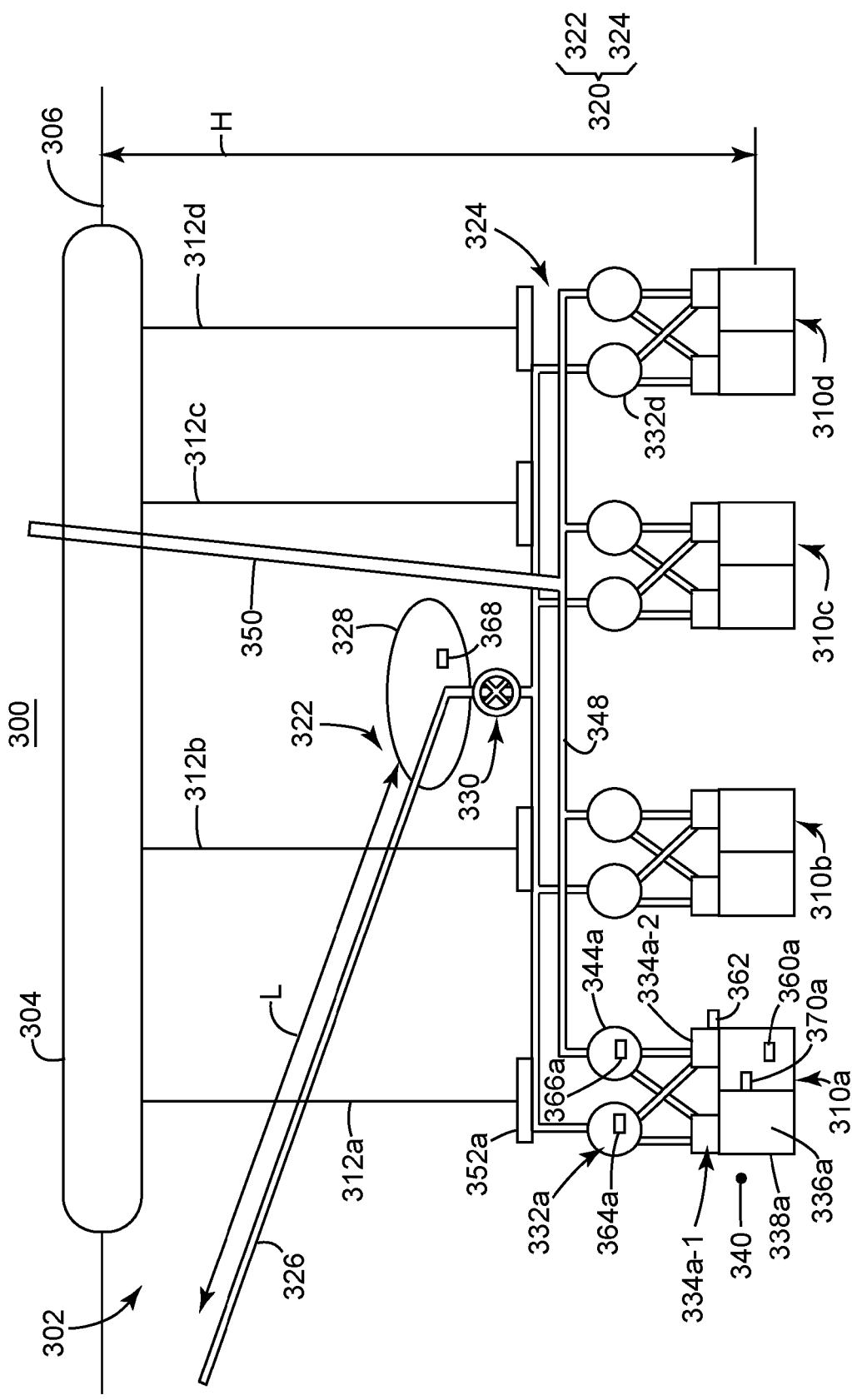
FIG. 3A is a schematic diagram of a sub-array having a pneumatic control system.

A pneumatic system for maintaining hydrostatic balance in one or more source elements is now discussed with regard to FIG. 3A, which illustrates a single sub-array 302 of a source array 300. Sub-array 302 includes a float 304 that floats at water surface 306. In one application, float 304 may be configured to float below the water surface. From float 304, plural source elements 310a-d are suspended through corresponding cables 312a-d, e.g. cables, ropes, chains and/or stretchable linkage. The number of source elements may vary depending on survey characteristics. FIG. 3A shows four source elements, but this number is exemplary and should not be construed to limit the invention.

Pneumatic system 320 includes a pressure supply mechanism 322 and a pressure relief mechanism 324. Pressure supply mechanism 322 is tasked with moving a fluid from the vessel (in this embodiment, however, it is possible, as discussed later, to have the fluid supplied from a local accumulator, thus, autonomous from the vessel) to each individual source element, while the pressure relief mechanism is tasked with removing the fluid from each source element. The supply and relief of the fluid may happen in an alternative sequence, as controlled by a control device to be discussed later. Both mechanisms act to maintain the hydrostatic balance between the source elements' external and internal pressures. Each mechanism is now discussed in detail.

Pressure supply mechanism 322 includes a fluid supply line 326 (e.g., a hose, conduit, etc.) that takes compressed fluid from the vessel and delivers it to the sub-array. The fluid may be air, dry air, or another gas, for example, nitrogen. The fluid may be transferred from the vessel at a high pressure. The fluid is compressed onboard the vessel by a main compressor (not shown) or another similar device. Supply line length L can be in the range of 500 to 1,000 m, in order to position the sources closer to the streamer whose receivers are positioned well back of the vessel to avoid noise associated with vessel motion/propulsion.

Because of supply line length, pressure drop and transient response become significant issues. Another significant issue for such a configuration is the large number of source elements. For example, a modern source array may include dozens of source elements, each requiring pressurized fluid. Further complicating the picture are the localized ambient pressure perturbations due to wave action, and sea swells, and the need for each source element to have the pressurized fluid as quickly as possible to balance the outside pressure. Other hydrodynamic forces due to towing may also act upon the piston face and need to be counter balanced. Therefore, the volume of fluid necessary during source array operation is significant. Supplying pressurized fluid from the vessel directly to each source element is slow, which results in unsatisfactory pressure balance. Because traditional pneumatic systems cannot quickly supply the fluid at high pressure over such long distances and to so many source elements, this application's inventors have proposed the following novel features.

To resolve the high-pressure requirement, a sub-array global accumulator 328 is located on each sub-array. This global accumulator (note that the term "global" applies to a given sub-array and not to the entire source array) stores the fluid under pressure and distributes it to each source element in the sub-array as needed. This configuration greatly reduces the distance between the supply and the source element, e.g., to less than 30 m. Using some exemplary numbers, in one application, if the fluid's pressure is 100 bar when leaving the vessel's compressor, the fluid's pressure in the accumulator 328 should also be around 100 bar. A pressure-reducing/pressure regulator valve 330 (e.g., passive types like spring/diaphragm activated or electrically driven solenoid, proportional, poppet, etc.) ensures that the pressurized fluid is delivered at a lower pressure to the seismic source elements. Each source element 310a has its own local supply accumulator 332a connected to pressure-reducing valve 330. The fluid's pressure in the local supply accumulator may be between 6 and 10 bars. Thus, the pressure-reducing valve/pressure regulator valve 330 may be configured to reduce the pressure by a factor of ten. Other values are possible.

Considering that each source element 310a is a twin driver as illustrated in FIGS. 2A-B, the pressurized fluid is distributed from the local supply accumulator 332a via corresponding local valves (e.g., pneumatic valves) 334a-1 and 334a-2 to the twin drivers. This high pressure is injected in the source element's interior 336a, on one side of each piston 338a, to counterbalance the outside pressure 340 that acts on the other side of the piston. Note that FIG. 3A is a schematic figure, not at scale and not intended to show the exact shape, position and size of the pressure mechanism or seismic source array. Should there be an increase in ambient pressure which might cause the pistons to move inward, pressurized fluid is delivered inside the source element at a pressure higher than the ambient pressure, thus helping the pistons move outwardly relative to the source element housing to keep the piston and actuator centered within its range of travel and to counteract the increase in ambient pressure. Likewise, should there be a decrease in ambient pressure which might cause the pistons to move outward, fluid is vented from inside the source element at a pressure lower than the ambient pressure, thus helping the pistons move inwardly relative to the source element housing to counteract the decrease in ambient pressure. Details about the control mechanism for determining when and how much pressurized fluid to allow inside the source element are discussed later.

Figure 4C:
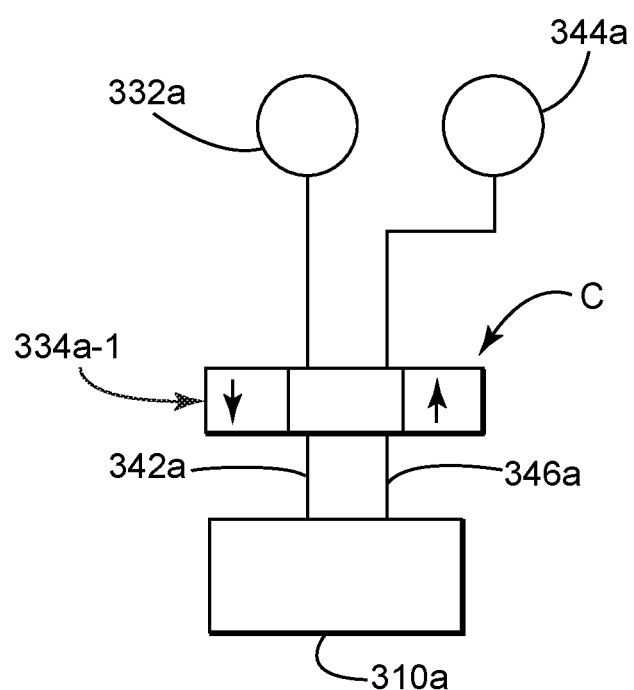

When the pistons need to move inwardly, the volume of the source element decreases, thus generating increased pressure inside it. The pressure relief mechanism 324 is responsible for preventing/reducing the pressure increase, as is now discussed. Pressure relief mechanism 324 may use local valves 334a-1 and 334a-2 or different pairs (if a twin driver is considered) of valves for removing fluid from inside the source element. In one application, local valves 334a-1 and 334a-2 are three-way valves as illustrated in FIGS. 4A-C, that can be a proportional spool valve type, a solenoid valve or comprised of poppet valves. However, local valves 334a-1 and 334a-2 may be plural single valves, for example, each valve 334a-1 and/or 334a-2 may include a set of single valves connected in parallel and driven by a same signal. This setup may be advantageous for increasing the flow rate. FIG. 4A shows the local supply accumulator 332a being in fluid communication with an input 342a of the source element when local valve 334a-1 is in state A. At the same time, a local vent accumulator 344a (e.g., one for each source element or one for the entire sub-array) and an output 346a of the source element are shut, i.e., not in fluid communication with each other. FIG. 4B illustrates the same setup with the difference that local valve 334a-1 is now in state B, i.e., blocking local supply accumulator 332a and input 342a and fluidly communicating local vent accumulator 344a with output 346a. FIG. 4C illustrates the same setup with the difference that local valve 334a-1 is now in state C, i.e., blocking local supply accumulator 332a from communication with input 3422a and blocking local vent accumulator 344a from communication with output 346a. State C coincides to the case where the ambient and internal housing pressures have been adequately equalized and no action is required. Other types of valves and/or other arrangements may be used as will be appreciated by those skilled in the art as long as the same control of the fluid is achieved. Pressure of the local vent accumulator is desired to be around 1 bar, but other values may also be used.

The local vent accumulators may be connected to a common line 348 as illustrated in FIG. 3A, and the common line is connected to a vent line 350 that directly communicates with the atmosphere above the water surface 306. Vent line 350 may be attached to float 304 or it may have its own float (not shown) for maintaining one of its ends in fluid communication with the atmosphere. The pressure relief mechanism is thus able to remove the fluid from inside the source elements (acting similar to a vacuum pump) and to expel that fluid in the atmosphere. In one application, if it is preferred to exhaust the housing fluid at depth, rather than running a vent line to the atmosphere to avoid line entanglements, the inlet of a pneumatic pump equipped with a pressure regulator mechanism could be attached to common line 348 to help maintain low pressure in the local vent accumulators. The exhaust port of the pneumatic pump could be connected to a short exhaust hose equipped with a check valve to vent the exhausted air at or above ambient pressure.

FIG. 3A also shows that each cable 312a-d is attached to corresponding plates 352a-d that offer mechanical support for the source elements, local supply accumulators, local vent accumulators, common lines, etc. FIG. 3A schematically illustrates the plates and their relations to the other elements.

Pressure mechanism 320 may also include pressure sensors distributed at various locations, for example, a pressure sensor 360a inside the source element, a pressure sensor 362 outside the source element to measure the ambient pressure, a pressure sensor 364a inside local supply accumulator 332a, a pressure sensor 366a inside local vent accumulator 344a, and/or a pressure sensor 368 inside global supply accumulator 328. A position sensor 370a may be located inside each source element for measuring and/or estimating a position of the piston relative to the source element housing. Either the pressure or position measurements (or another appropriate quantity) may be used in a feedback loop control for balancing the hydrostatic pressure.

Figure 3B:
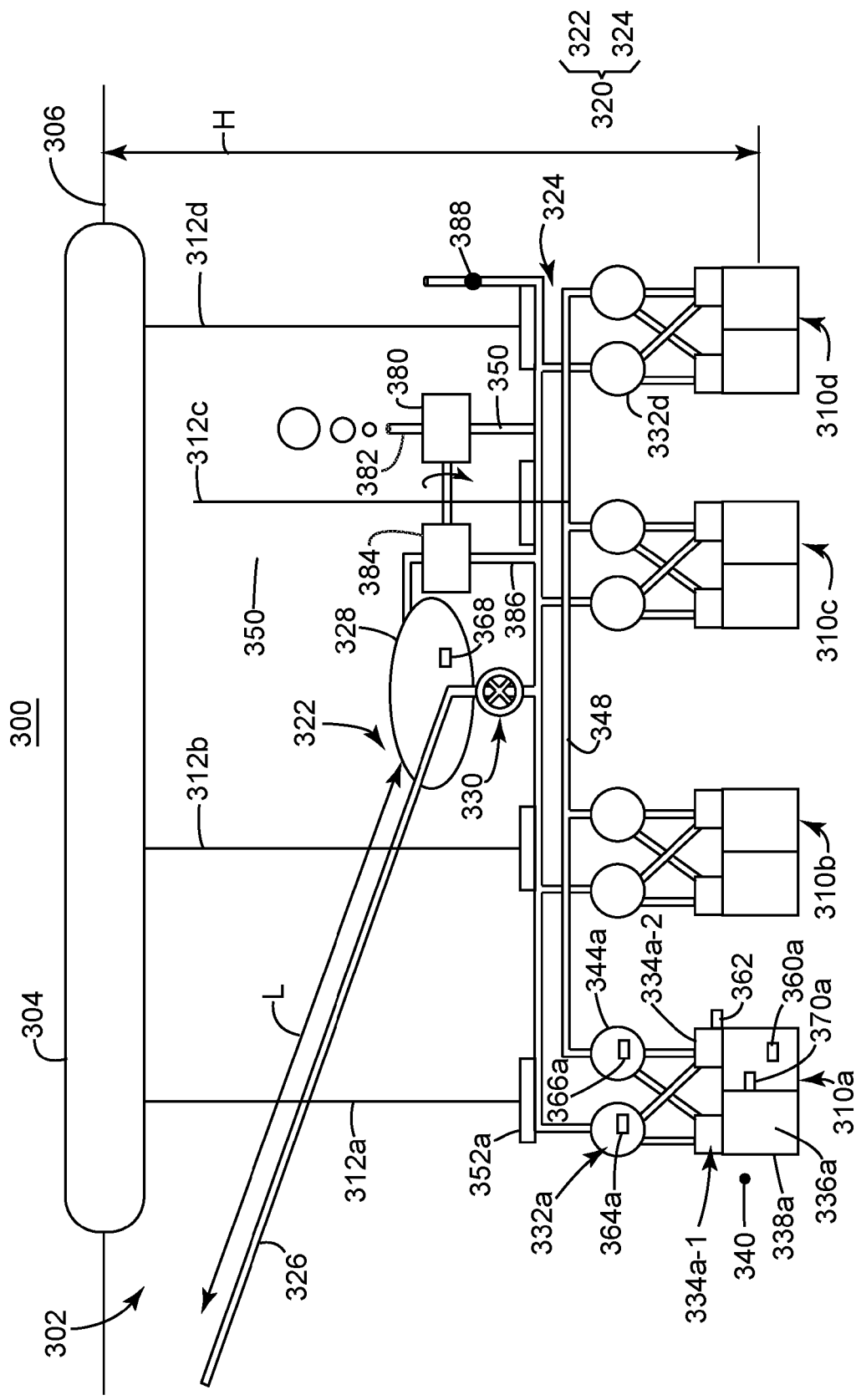
FIG. 3B is another schematic diagram of a sub-array having a pneumatic control system.

According to a variant embodiment illustrated in FIG. 3B, a vacuum pump 380 may be connected to common line 348 for removing the low pressure air from the source elements. Vacuum pump 380 may have a vent line 382 that discharges the air directly to the ambient. Thus, vent line 350 shown in FIG. 3A is not necessary. Vacuum pump 380 may be actuated by a pneumatic motor 384. Pneumatic motor 384 may be connected to accumulator 328 and is driven by the high pressure air from this accumulator. The vacuum pump may be, for example, a dry scroll pump. The exhaust of the pneumatic motor may be connected through conduit 386 to local supply accumulators 332a-d to fill them with air to maintain the hydrostatic balance. In one application, the pneumatic motor may work in parallel with pressure-reducing valve 330, and a pressure relief valve 388 may be used to keep the supply pressure from getting too high. Thus, according to this embodiment, there is no need for a vent hose to the surface and instead air could be exhausted at the same depth as the source.

Figure 6:
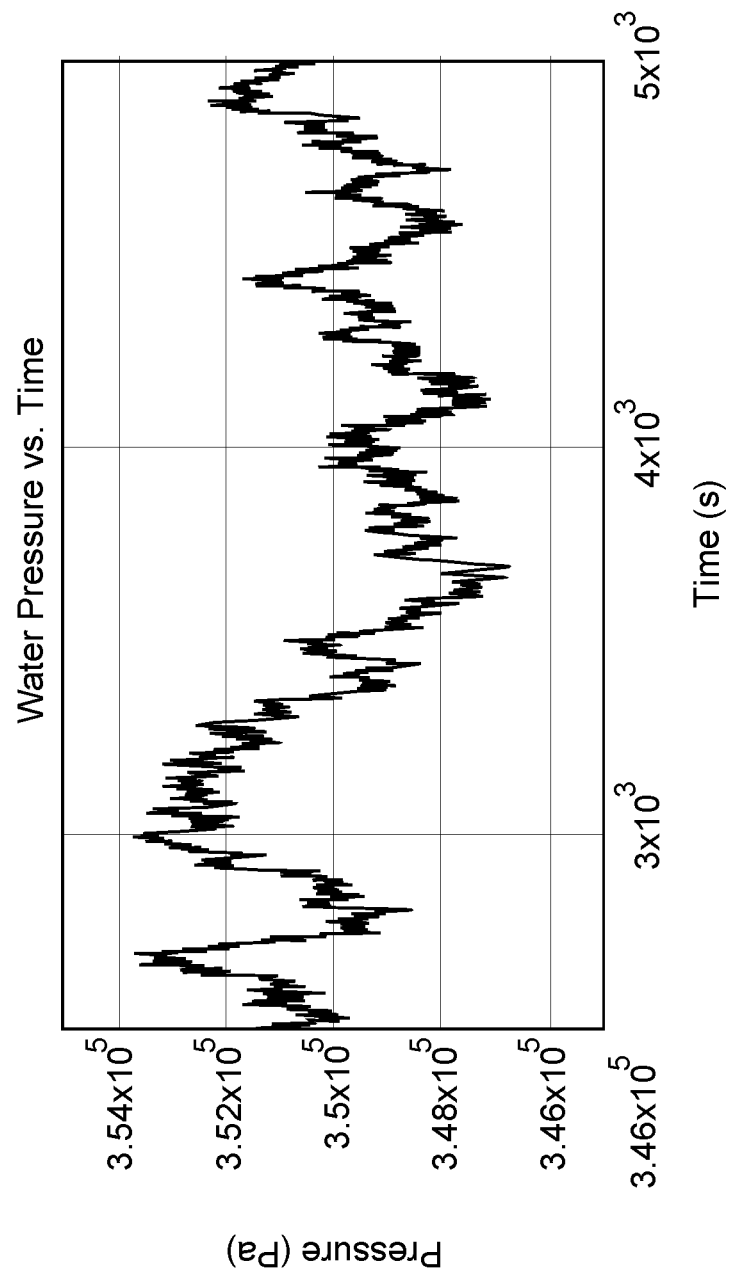
FIG. 6 is a graph illustrating a variation of an ambient pressure with time while a source element is underwater.

In one embodiment, as illustrated in FIG. 5, a source sub-array includes, besides the elements illustrated in FIG. 3A or 3B (and reproduced in FIG. 5), a controller 502. Controller 502 may be located on the sub-array to act as a local controller, or on the vessel to act as a global controller, or it may be distributed between the sub-array and the vessel. Controller 502 is electrically connected to pressure-reducing valve 330, local valve 334a-1 (also local valve 334a-2, but for simplicity, this case is not illustrated because it behaves similarly to valve 334a-1), inside pressure sensor 336a and outside pressure sensor 362. Controller 502 is configured to receive, with a given frequency (preferably less than 2 Hz for not interfering with the pistons' movement), pressure measurements from the inside and outside pressure sensors. In one application, if a difference between the two pressures is greater than a pre-established threshold, e.g., inside pressure is less than outside pressure, controller 502 controls local valve 334a-1 to release more pressurized fluid from local supply accumulator 332a into the inside of source element 310*a*. If the opposite situation is true, i.e., outside pressure is less than inside pressure, controller 502 changes the state of valve 334*a*-2 to shut local supply accumulator 332*a* and to fluidly connect the inside of the source element with the local vent accumulator 344*a* to reduce inside pressure. Because inside pressure changes continuously during piston operation, and because outside pressure also may change in time (due to swells, changing source element depth, temperature change, etc.) as illustrated in FIG. 6, controller 502 needs to continuously monitor pressure changes and quickly adjust inside pressure. Continuous monitoring implies that a comparison between internal and external pressures is performed with certain regularity, e.g., every 0.5 s or more frequently. Quick adjustment of internal pressure is achieved by having the fluid reservoirs close to each source element (i.e., the local supply accumulator and local vent accumulator). Note that in one application the same may be achieved without the presence of global accumulator 328. Controller 502 may also coordinate the opening and closing of valve 330 for supplying pressurized fluid from global accumulator to local accumulators. If valve 330 is a proportional valve, controller 502 may control the metering area of valve 330 so as to smoothly vary the fluid flow rate. In one application, each source element has its own controller 502. However, in another application, controller 502 controls all of a given sub-array's source elements. In still another application, controller 502 controls all the source elements of the source array.

Comparing the external and internal pressures is one possible approach (loop) for controlling the source elements' hydrostatic balance. Another possibility is to measure the piston's position relative to the source element housing and then subtract off the displacement contribution due to the sweep (or some fraction of the displacement contribution due to the sweep, for example, about 90%), and to use this result as a feedback signal to controller 502. Note that the displacement contribution due to piston sweep may be calculated, based on a theoretical model, or measured during a dry test prior to deploying the seismic source element in water. The controller driving the local valves can use an averaged or low-pass filtered piston displacement signal as a feedback signal to keep the actuator centered during operation. Other closed loop control schemes are possible, such as schemes that have a closed loop bandwidth that falls below the sweep frequency bandwidth of interest so the pneumatic control loop ignores rapid piston motion due to sweeping.

Various modifications may be envisioned to the embodiments illustrated in FIGS. 3A-B that still achieve source element pressure balance. For example, instead of having vent line 350 communicating with the atmosphere, it is possible to extend this line back to the vessel and form a closed pneumatic circuit so the fluid is returned to the vessel compressor to be recirculated. To help move the fluid back to the ship, one or more pumps (not illustrated) may be added to the sub-array or to each source element. In another application, the source element housing includes a chamber 510, as illustrated in FIG. 5, that houses the electronics, and it is isolated from the interior 512 of the source element. Chamber 510's pressure may be at atmospheric pressure. In this embodiment, the fluid from interior 512 (which has a greater pressure than that inside chamber 510) may be quickly released through an internal valve 514 to chamber 510. In still another embodiment, chamber 510 is made to communicate with valve 334*a*-1 for venting the fluid outside.

In another embodiment illustrated in FIG. 7A, a source sub-array 700 has plural source elements 702, one of which is illustrated for simplicity. In this embodiment, the hydrostatic balance between source element 702's inside and outside is achieved by a movable internal piston that adjusts its position to control the inside pressure. More specifically, FIG. 7A shows a housing 704 having one end 706 closed by an external piston 708. Movement of piston 708 generates the desired seismic waves. FIG. 7A schematically shows a shaft 710 attached between piston 708 and actuator 712. As noted previously, actuator 712 may be attached by a bracket 714 or any equivalent structure to housing 704. However, different from the embodiments illustrated in FIGS. 2A-B, an internal piston 716 is completely provided inside housing 704 so it divides housing 704's inside into first chamber 718A and second chamber 718B. A different, secondary actuator system 720 is attached to housing 704 and configured to actuate internal piston 716 through one or more shafts 722. For maintaining the pressure inside first chamber 718A, a sealing mechanism 724 is distributed between internal piston 716 and housing 704.

A controller 726, which can be located inside or outside the source element, on the vessel, or in any other combination thereof, is configured to coordinate main actuator 712 and secondary actuator 720 so that when a pressure inside first chamber 718A increases more than a predetermined threshold over outside pressure, internal piston 716 moves to increase a volume of first chamber 718A to decrease the pressure in this chamber. Controller 726 is also configured to move the internal piston in the opposite direction if the pressure inside first chamber 718A decreases. Controller 726 may be connected to pressure sensors similar to controller 502 in FIG. 5 for controlling a movement of the two pistons. Alternatively, controller 726 may achieve pressure balance by monitoring a position of piston 708, as is also discussed above with regard to FIG. 5.

Similar to the embodiment illustrated in FIG. 3A, a local supply accumulator 730 may be located on or next to source element 702 to supply pressurized fluid inside first chamber 718A. A valve 732 controls the pressurized fluid's inflow inside first chamber 718A. A local vent accumulator 734 may also be located on or next to the source element for removing the fluid from inside first chamber 718A. A corresponding valve 736 controls the fluid's outflow from first chamber 718A. Alternatively, instead of having local vent accumulator 734, a vent line may be fluidly connected to the atmosphere for venting out the fluid from first chamber 718A. If a vent line is used, a fan or a pump (not shown) may also be used to control the fluid's outflow. Note that controller 726 is connected to both valves 732 and 736 and also to the pump, if one is present, to control the pressure balance inside and outside first chamber 718A.

In one application, local supply accumulator 730 is not connected to the vessel or any other fluid supply. In other words, the local supply accumulator is an autonomous unit, similar to a scuba diving unit, which contains the necessary fluid under pressure. However, in another application, it is possible to connect the local supply accumulator 730 to fluid supply on the vessel. If the local supply accumulator 730 is autonomous, the local vent accumulator or vent line may also be autonomous, i.e., they are not connected to the vessel. In this case, source element 702 is configured to function without pneumatic assistance from the vessel. Note that in one application, internal piston 716 is configured to adjust the pressure inside first chamber 718A to account only for swells.

Figure 7B:
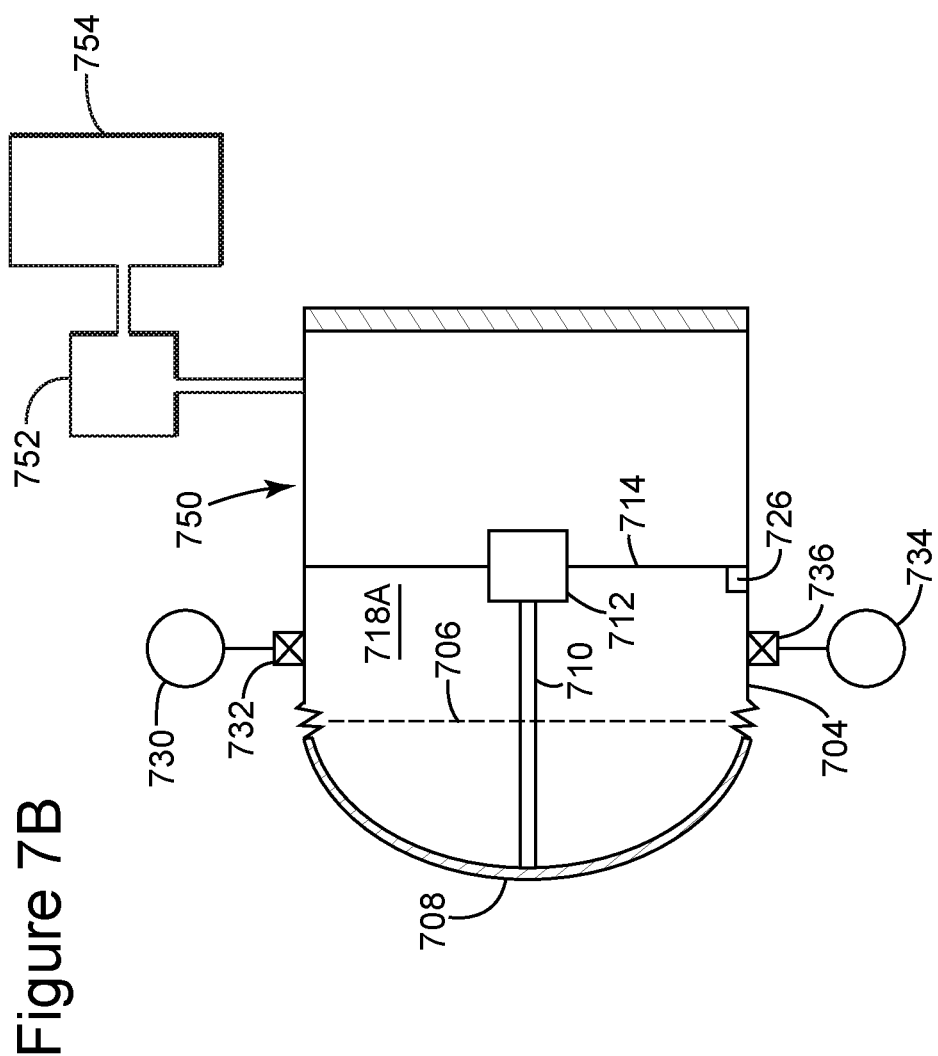
FIG. 7B is a schematic diagram of a pneumatic control system having a reversible pump according to an embodiment.

A similar source element is illustrated in FIG. 7B. However, this source element does not use an internal piston 716 and associated actuator system 720 for balancing the inside pressure with the ambient pressure, but rather uses a pump 752 connected to a reservoir 754 for achieving the same function. Pump 752 is configured to act either as an air compressor or as a vacuum pump. Controller 726 controls pump 752 so that air is removed from source element 750 when the hydrostatic pressure decreases. When the hydrostatic pressure increases, pump 752 reverses its function and adds air to the source element. This could be a closed system with no hoses to the surface or to the vessel. Pump 752 may be a vane, scroll or diaphragm pump or a piston pump. In one application, instead of reversing the function of the pump, a four-way valve may be used to reverse the inlet and outlet lines of the pump. Note that local supply accumulator 730 and local supply valve 732 are optional for this embodiment.

Figure 8:
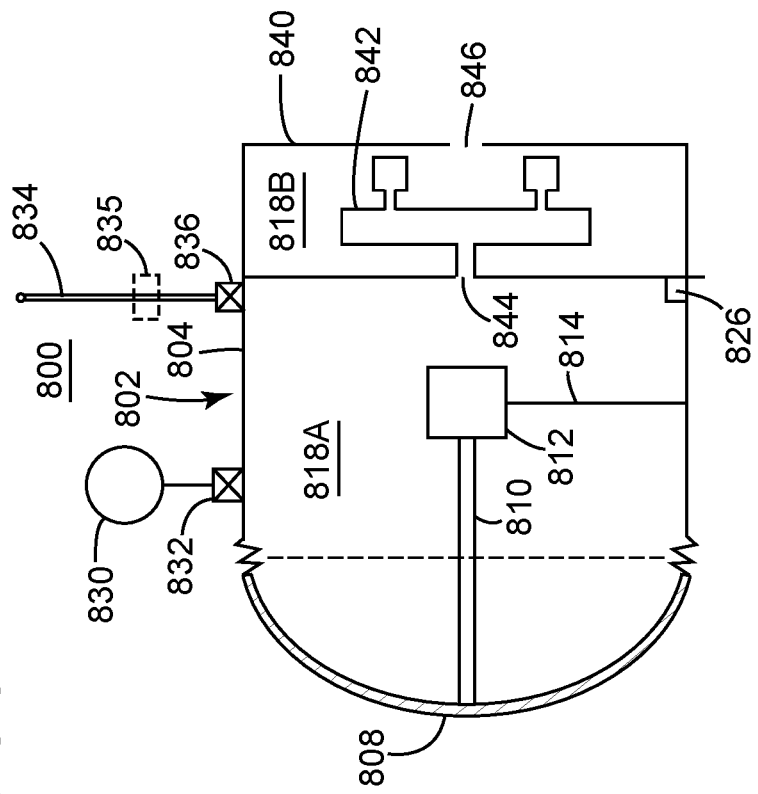
FIG. 8 is a schematic diagram of a pneumatic control system according to still another embodiment.

FIG. 8 illustrates another embodiment similar to that discussed with reference to FIG. 7A, but having a bladder system instead of an internal piston. More specifically, FIG. 8 shows a rigid enclosure 840 attached to the housing 804 and forming a second chamber 818B. A bladder system 842 is located inside rigid enclosure 840 and sized to release or absorb enough fluid into first chamber 818A to compensate for pressure variation produced by swells. Bladder system 842 fluidly communicates with first chamber 818A through a passage 844. Passage 844 may be sized or contain an orifice, for example, to balance pressure variation due to swells (below 4 Hz) with the minimum pressure loss and to ensure the function of actuator 812 for operational frequencies (e.g., between 5 Hz and 25 Hz for a low-frequency source element). Rigid enclosure 840 may have another passage 846 that communicates with the ambient (i.e., seawater) such that the ambient pressure acts directly on the bladder exterior to help equalize the ambient pressure and interior housing pressure. Passage 846 may be sized so as to respond to low frequency changes in ambient pressure and not so large as to create a significant acoustic leakage pathway for sound produced by the sweep.

The embodiment illustrated in FIG. 8 may have an autonomous local supply accumulator 830, i.e., not connected to the vessel's fluid supply. However, in one application, similar to the embodiment illustrated in FIG. 7A, the local supply accumulator 830 may in fact be connected to the vessel's fluid supply. In one application, bladder 842 may be designed to have a volume twice the volume required to balance the pressure inside first chamber 818A. A local vent accumulator or vent line 834 may be connected to first chamber 818A for venting out the excess pressure inside the first chamber. Controller 826's functionality may be limited to controlling only actuator 812 and/or local valves 832 and 836. In one embodiment, vent line 834 is connected to a pump 835 that is configured to vent out the fluid from the housing. In this application, vent line 834 does not need to extend to the water surface. In another application, if the pump 835 is present, no vent line 834 may be needed. Pump 835 may be attached to an outside of enclosure 804. The pump with the above-noted configurations may also be implemented in the other embodiments, e.g., the embodiment of FIG. 5.

The following configuration of the controller may apply to any of the above-noted embodiments. The controller may be configured to control the local supply valve such that the pressure inside the enclosure does not fall significantly below the ambient pressure while seismic waves are generated. The controller may also be configured to control the local vent valve so that the pressure inside the enclosure does not significantly exceed the ambient pressure while seismic waves are generated. The controller may be programmed to read from storage device (e.g., a memory) first and second thresholds such that the pressure inside the enclosure does not fall more than the first threshold relative to the ambient pressure, and the pressure inside the enclosure does not exceed the ambient pressure by more than the second threshold. In one application, the first and second thresholds are equal.

Figure 9:
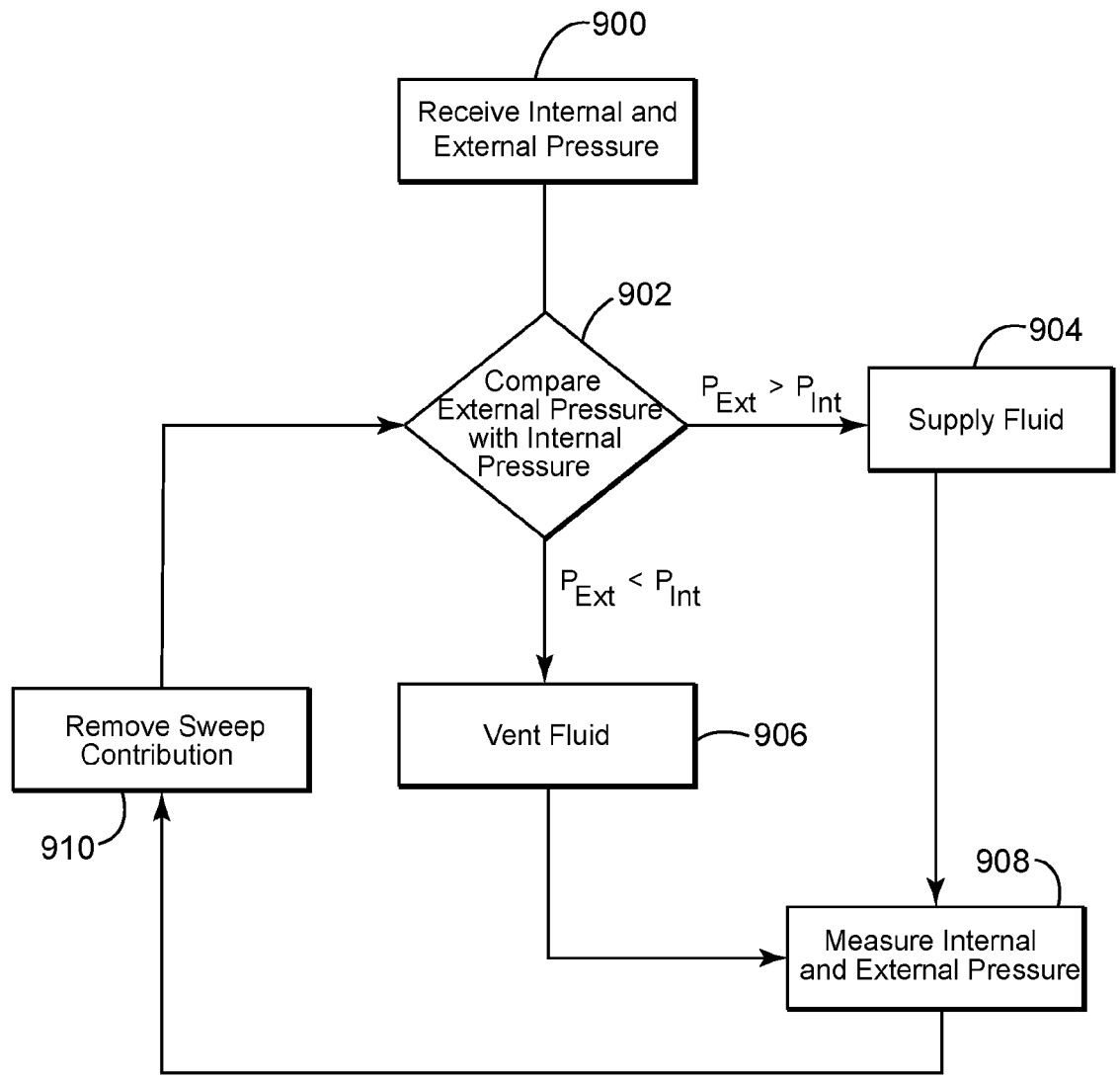
FIG. 9 is a flowchart of a method for maintaining a pressure balance for a source element.

A method for maintaining pressure balance outside and inside a seismic source is now discussed with regard to FIG. 9. In step 900, inside and outside pressures are received at a controller. Alternatively, a piston position is received at the controller. In step 902 the two pressures are compared or the piston position is compared to a given chart that illustrates the piston position in time. If the external pressure is higher than the internal pressure by a given value, the controller activates in step 904 a valve to supply fluid from a local supply accumulator to an inside of the source element. If the opposite condition is true, the controller activates in step 906 the same valve or another valve to vent fluid out from inside the source element. These steps may be adapted to control the valves based on the piston position relative to the given chart. The supplying or venting of fluid may happen for a predetermined period of time. In one application, supplying or venting may happen until a new measurement is performed in step 908. In step 910, the contribution of the sweep to the housing interior pressure is removed from the output of step 908, and then the process returns to step 902. In general, for improved efficiency, a housing air-spring resonance is employed in the source element design. The trapped fluid inside the housing acts like a spring that in combination with the combined mass loading due to the driven structure mass and radiation mass creates a resonance effect, typically in the midrange of the sweep range. So it is usually desired to ignore the sweep contribution to the housing pressure variation so as to not defeat the housing air-spring.

Figure 10A:
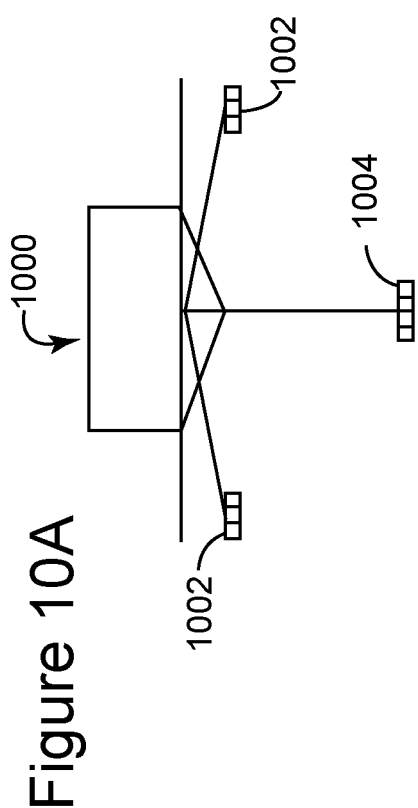
FIGS. 10A-B illustrate a possible distribution of low- and high-frequency source elements in a source array.

When implemented in an actual seismic survey system, a seismic source array 1200 having the source elements discussed with reference to FIGS. 3, 7 and 8 may have, as illustrated in FIG. 10A, two high-frequency sub-arrays 1002 and a single low-frequency sub-array 1004. Each sub-array may have plural source elements as discussed above. In one application, the high-frequency sub-arrays 1002 are towed at a depth of about 5 m, while the low-frequency sub-array 1004 is towed at a depth of about 25 m.

A side view of a marine acquisition system 1006 that includes seismic sources having pistons shaped and configured as discussed above is illustrated in FIG. 10B. System 1006 includes a towing vessel 1008 that tows the seismic array 1000. Seismic array 1000 may include, as discussed with regard to FIG. 10A, one or more high-frequency sub-arrays 1002 positioned at a depth H1 and one or more low-frequency sub-arrays 1004 positioned at a depth H2, where H2 is deeper than H1. Depth controllers 1010 may be located on or next to each sub-array for maintaining a desired depth. Umbilicals 1012 connect each sub-array to vessel 1008. An umbilical may include a strength member, command and data capabilities, electrical power, and pneumatic air supply.

A mechanical interface 1012 connects corresponding umbilical components to a pneumatic supply system 1014, a power supply system 1016, and a command and control device 1018. Command and control device 1018 may include a processing unit, as described later, that is capable to receive and process seismic data for imagining the surveyed subsurface. Command and control device 1018 may also be configured to control a trajectory of the seismic source, adjust its trajectory and control the shooting of the source elements. Command and control device 1018 may interact with the vessel's navigation system.

Figure 10B:
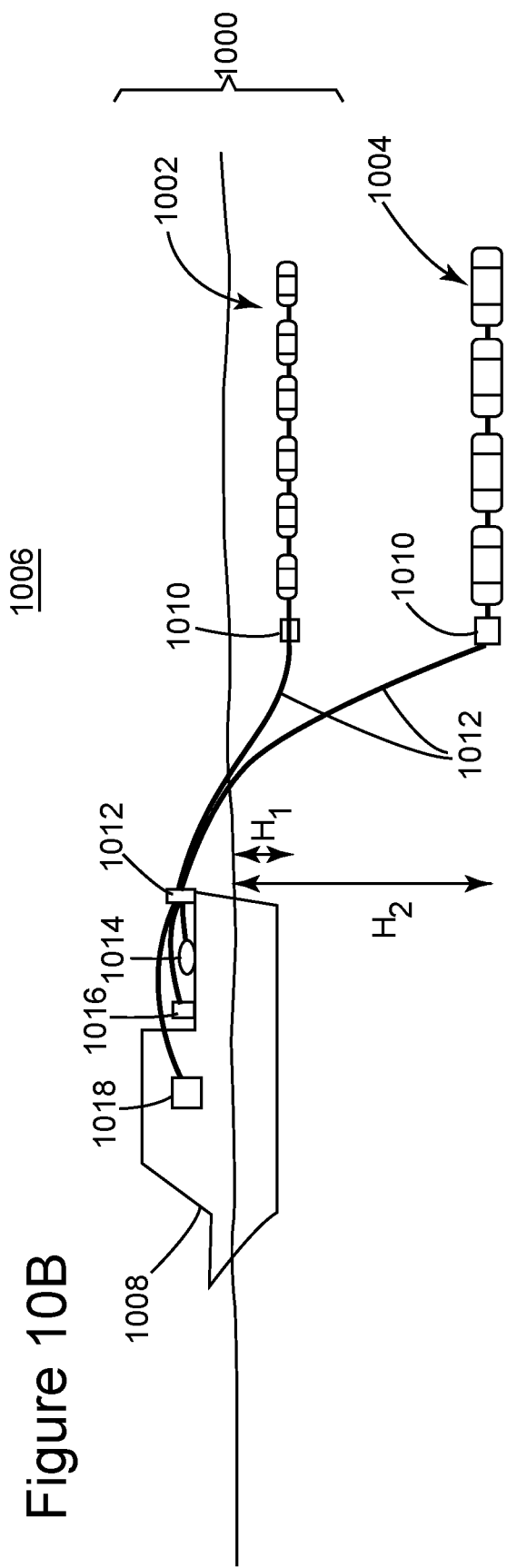
Figure 11:
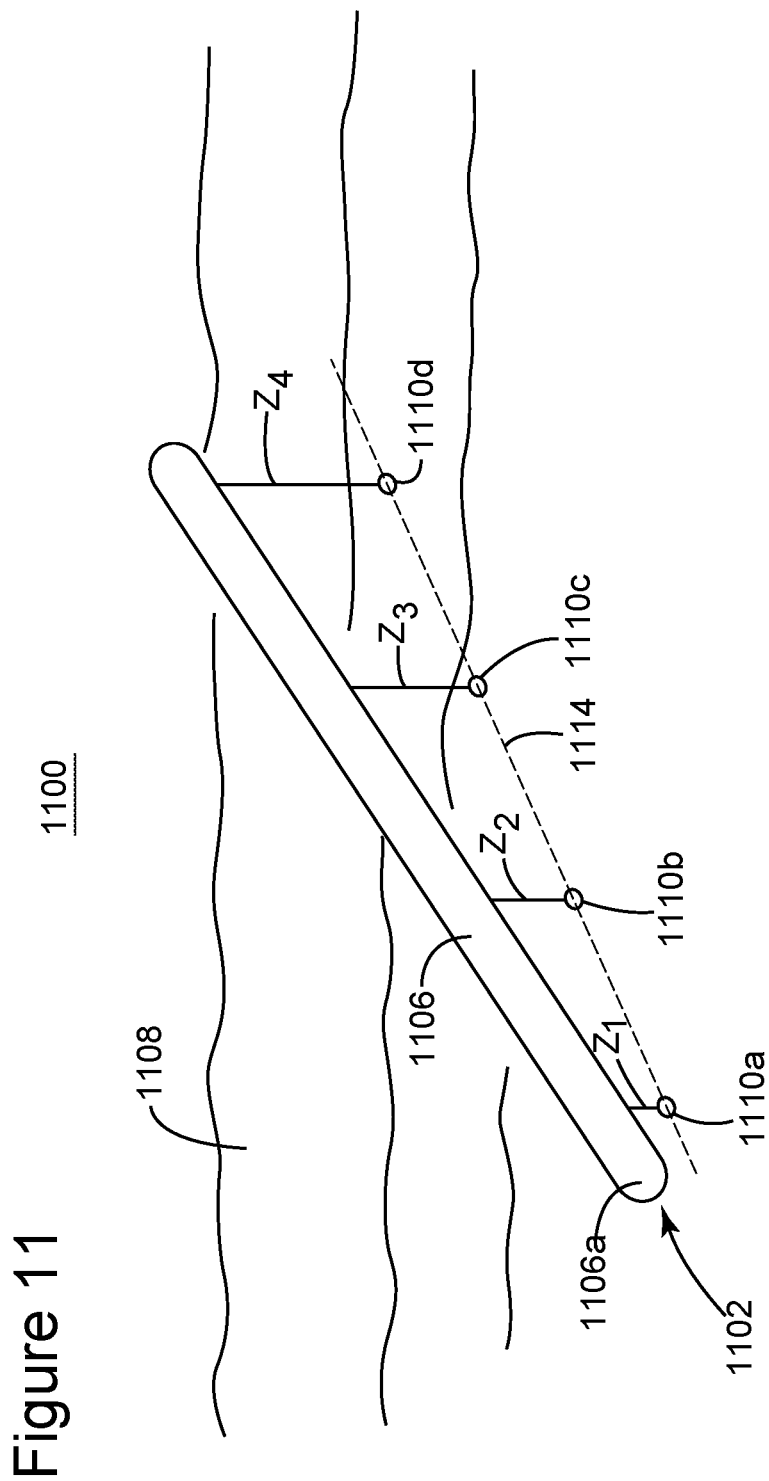
FIG. 11 illustrates a multi-component source array.

Although FIG. 10B shows each sub-array having a horizontal distribution, note that a multi-level source may be used instead of source array 1004. For example, a multi-level source 1100 is illustrated in FIG. 11 as having one or more sub-arrays. The first sub-array 1102 has a float 1106 configured to float at the water surface 1108 or underwater at a predetermined depth. Plural source elements 1110a-d are suspended from float 1106 in a known manner. A first source element 1110a may be suspended closest to head 1106a of float 1106, at a first depth z1. A second source element 1110b may be suspended next, at a second depth z2, different from z1. A third source element 1110c may be suspended next, at a third depth z3, different from z1 and z2, and so on. FIG. 11 shows, for simplicity, only four source elements 1110a-d, but an actual implementation may have any desired number of source points. In one application, because the source elements are distributed at different depths, the source elements at the different depths are not simultaneously activated. In other words, the source array is synchronized, i.e., a deeper source element is activated later in time (e.g., 2 ms for 3 m depth difference when the speed of sound in water is 1,500 m/s) such that corresponding sound signals produced by the plural source elements coalesce, and thus, the overall sound signal produced by the source array appears as being a single sound signal. In one embodiment, the high-frequency source elements are simultaneously activated in a flip-flop mode with the source elements of the low-frequency source elements. In another embodiment, all the source elements are simultaneously activated with incoherent, coded signals so that the recorded seismic signals can be separated based on the source element that emitted that signal.

The depths z1 to z4 of the source elements of the first sub-array 1102 may obey various relationships. In one application, the source elements' depths increase from the head toward the tail of the float, i.e., $z1<z2<z3<z4$. In another application, the source elements' depths decrease from the head to the tail of the float. In another application, the source elements are slanted, i.e., provided on an imaginary line 1114. In still another application, line 1114 is straight. In yet another application, line 1114 is curved, e.g., part of a parabola, circle, hyperbola, etc. In one application, the depth of the first source element for sub-array 1102 is about 5 m and the greatest depth of the last source element is about 8 m. In a variation of this embodiment, the depth range is between 8.5 and 10.5 m or between 11 and 14 m. In another variation of this embodiment, when line 1114 is straight, the depths of the source elements increase by 0.5 m from one source element to an adjacent source element. Those skilled in the art would recognize that these ranges are exemplary and these numbers may vary from survey to survey. A common feature of all these embodiments is that the source elements have variable depths so a single sub-array exhibits multiple-level source elements.

The above embodiments were discussed without specifying the type of seismic receivers used to record seismic data. In this sense, it is known in the art to use, for a marine seismic survey, streamers towed by one or more vessels, and the streamers include seismic receivers. The streamers may be horizontal, slanted or have a curved profile as illustrated in FIG. 12.

Figure 12:
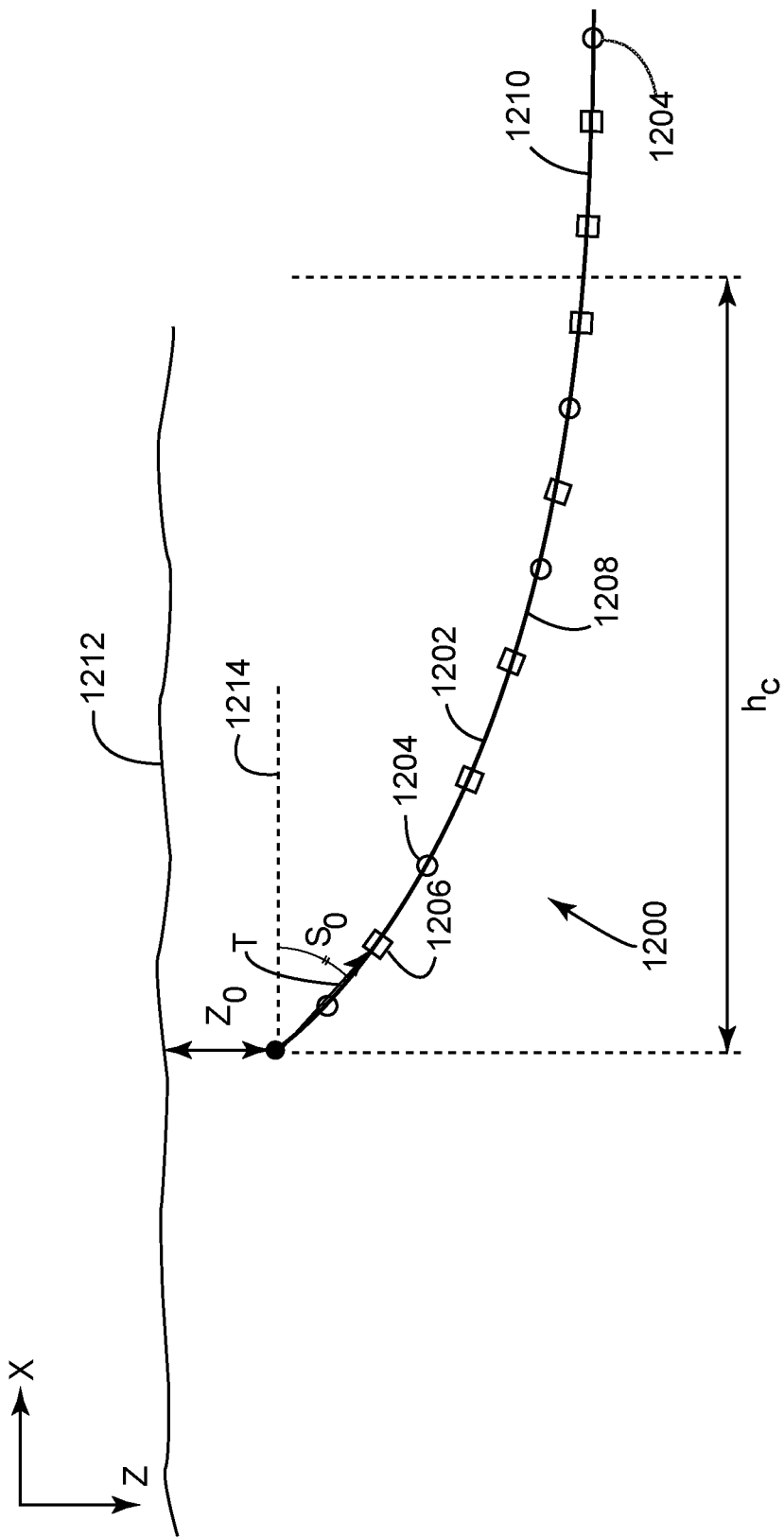
FIG. 12 illustrates a curved streamer.

Curved streamer 1200 of FIG. 12 includes a body 1202 having a predetermined length, plural detectors 1204 provided along the body, and plural birds 1206 provided along the body for maintaining the selected curved profile. The streamer is configured to flow underwater when towed such that the plural detectors are distributed along the curved profile. The curved profile may be described by a parameterized curve, e.g., a curve described by (i) a depth $z_0$ of a first detector (measured from the water surface 1212), (ii) a slope $s_0$ of a first portion T of the body with an axis 1214 parallel with the water surface 1212, and (iii) a predetermined horizontal distance $h_c$ between the first detector and an end of the curved profile. Note that not the entire streamer has to have the curved profile. In other words, the curved profile should not be construed to always apply to the entire length of the streamer. While this situation is possible, the curved profile may be applied only to a portion 1208 of the streamer. In other words, the streamer may have (i) only a portion 1208 with the curved profile or (ii) a portion 1208 curved and a portion 1210 with a flat profile, with the two portions attached to each other.

Figure 13:
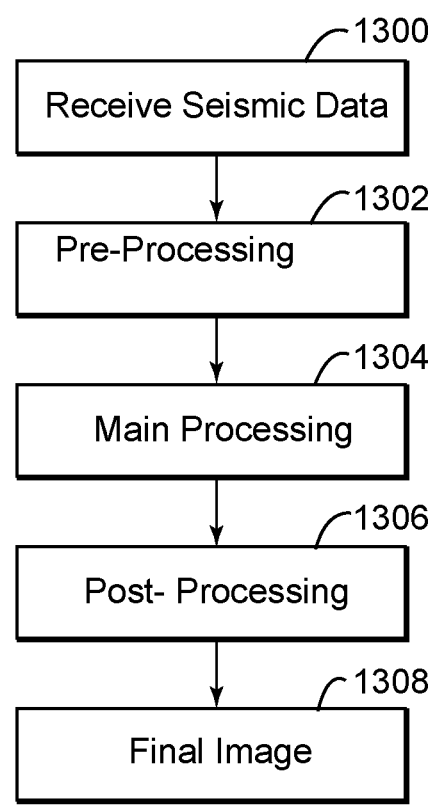
FIG. 13 is a flowchart of a method for acquiring seismic data with a source having an optimized piston.

Seismic data generated by the seismic sources discussed above and acquired with the streamers noted in FIG. 12 may be processed in a corresponding processing device for generating a final image of the surveyed subsurface as discussed now with regard to FIG. 13. For example, the seismic data generated with the source elements as discussed with regard to FIGS. 3, 7 and 8 may be received in step 1300 at the processing device. In step 1302, pre-processing methods are applied, e.g., demultiple, signature deconvolution, trace summing, motion correction, vibroseis correlation, resampling, etc. In step 1304, the main processing takes place, e.g., deconvolution, amplitude analysis, statics determination, common middle point gathering, velocity analysis, normal-move out correction, muting, trace equalization, stacking, noise rejection, amplitude equalization, etc. In step 1306, final or post-processing methods are applied, e.g. migration, wavelet processing, seismic attribute estimation, inversion, etc. and in step 1308 the final image of the subsurface is generated.

Figure 14:
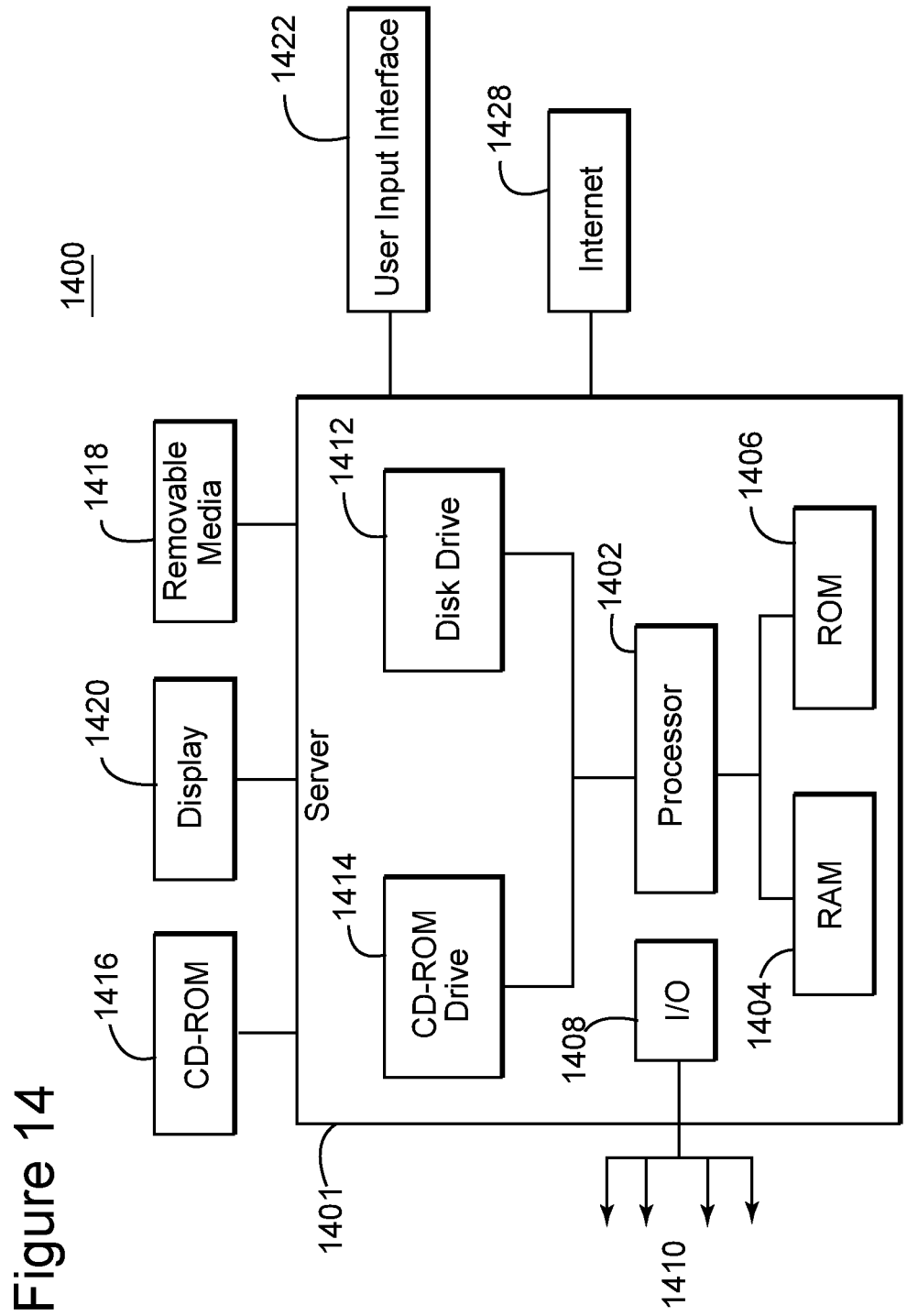
FIG. 14 is a schematic diagram of a control device for implementing methods as noted above.

An example of a representative processing device capable of carrying out operations in accordance with the embodiments discussed above is illustrated in FIG. 14. Hardware, firmware, software or a combination thereof may be used to perform the various steps and operations described herein. The processing device 1400 of FIG. 14 is an exemplary computing structure that may be used in connection with such a system, and it may implement any of the processes and methods discussed above or combinations of them.

The exemplary processing device 1400 suitable for performing the activities described in the exemplary embodiments may include server 1401. Such a server 1401 may include a central processor unit (CPU) 1402 coupled to a random access memory (RAM) 1404 and to a read-only memory (ROM) 1406. The ROM 1406 may also be other types of storage media to store programs, such as programmable ROM (PROM), erasable PROM (EPROM), etc. Processor 1402 may communicate with other internal and external components through input/output (I/O) circuitry 1408 and bussing 1410, to provide control signals and the like. For example, processor 1402 may communicate with the sensors, electro-magnetic actuator system and/or the pressure mechanism of each source element. Processor 1402 carries out a variety of functions as are known in the art, as dictated by software and/or firmware instructions.

Server 1401 may also include one or more data storage devices, including disk drives 1412, CD-ROM drives 1414, and other hardware capable of reading and/or storing information, such as a DVD, etc. In one embodiment, software for carrying out the above-discussed steps may be stored and distributed on a CD-ROM 1416, removable media 1418 or other form of media capable of storing information. The storage media may be inserted into, and read by, devices such as the CD-ROM drive 1414, disk drive 1412, etc. Server 1401 may be coupled to a display 1420, which may be any type of known display or presentation screen, such as LCD, plasma displays, cathode ray tubes (CRT), etc. A user input interface 1422 is provided, including one or more user interface mechanisms such as a mouse, keyboard, microphone, touch pad, touch screen, voice-recognition system, etc.

Server 1401 may be coupled to other computing devices, such as the equipment of a vessel, via a network. The server may be part of a larger network configuration as in a global area network (GAN) such as the Internet 1428, which allows ultimate connection to the various landline and/or mobile client/watcher devices.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such a floppy disk or magnetic tape. Other non-limiting examples of computer-readable media include flash-type memories or other known types of memories.

The disclosed exemplary embodiments provide a source array, seismic vibro-acoustic source element and a means for maintaining a pressure balance between the interior of a seismic enclosure and the ambient pressure so as to ensure that the acoustic actuator can operate within its design specifications. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A source element for generating seismic waves in water, the source element comprising:
   an enclosure;
   a first piston configured to move relative to the enclosure to generate the seismic waves;
   a first actuator, located inside the enclosure, and configured to move the first piston back and forth relative to the enclosure;
   a second piston located inside the enclosure; and
   a second actuator, located inside the enclosure, and configured to move the second piston back and forth relative to the enclosure to control a pressure of an inside of the enclosure;
   wherein the second piston separates the inside of the enclosure into first and second chambers.

2. The source element of claim 1, wherein the first actuator is located within the first chamber and the second actuator is located within the second chamber.

3. The source element of claim 1, further comprising: a controller configured to control the second actuator to increase a volume of the first chamber by moving the second piston when a pressure inside the first chamber increases beyond a predetermined threshold over an outside pressure.

4. The source element of claim 1, further comprising: a first sealing mechanism located between the first piston and the enclosure to prevent ambient water to enter the inside of the enclosure; and a second sealing mechanism located between the second piston and the enclosure.

5. The source element of claim 1, further comprising:
   a local supply accumulator fluidly communicating with the inside of the enclosure, wherein the local supply accumulator stores a fluid that is also present inside the enclosure,
   a pressure of the fluid inside the local supply accumulator being larger than a pressure of the fluid inside the enclosure; and
   a local supply valve located between the local supply accumulator and the enclosure and configured to control a flow of the fluid from the local supply accumulator to the interior of the enclosure.

6. The source element of claim 1, further comprising:
   a vent line fluidity connected to the inside of the enclosure and configured to remove a fluid from the inside of the enclosure.

* * * * *